Patented Sept. 12, 1922.

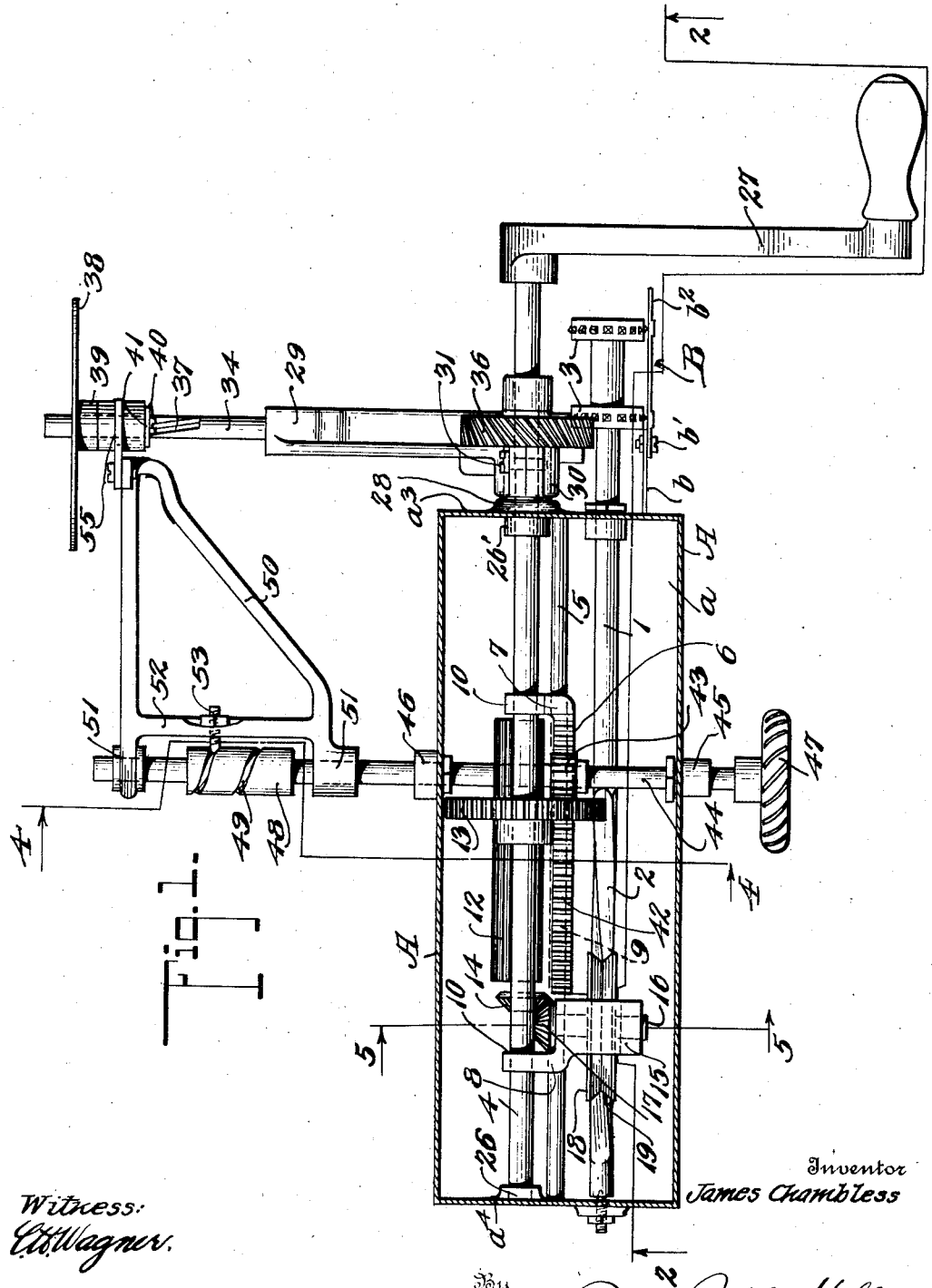

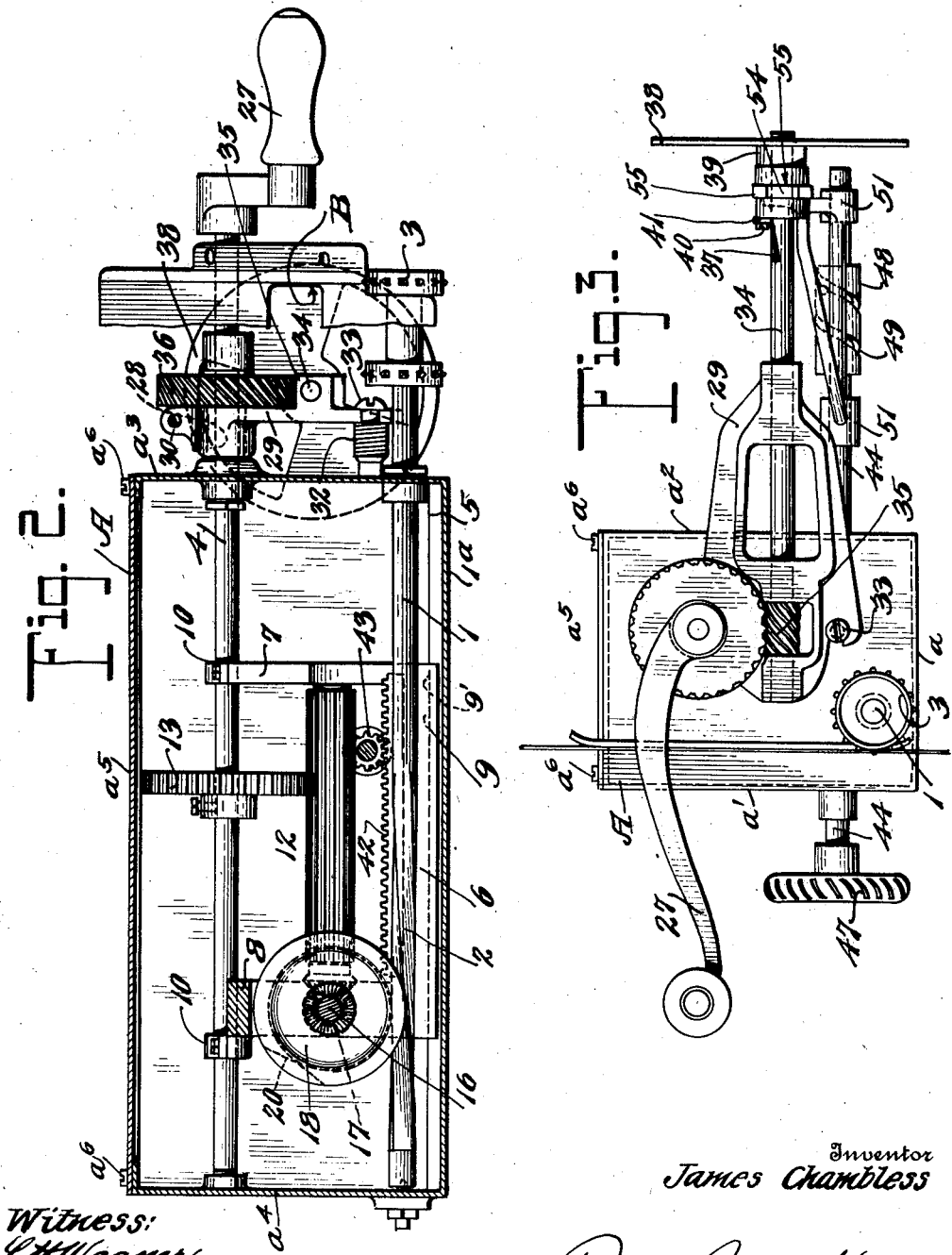

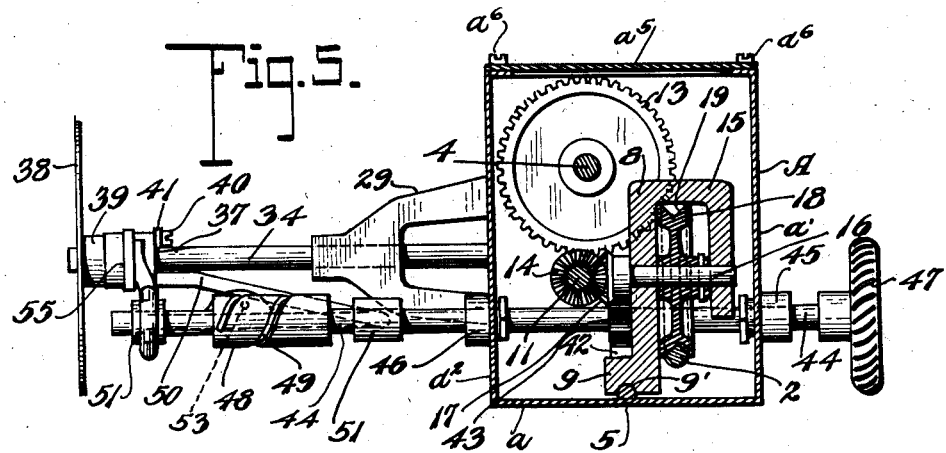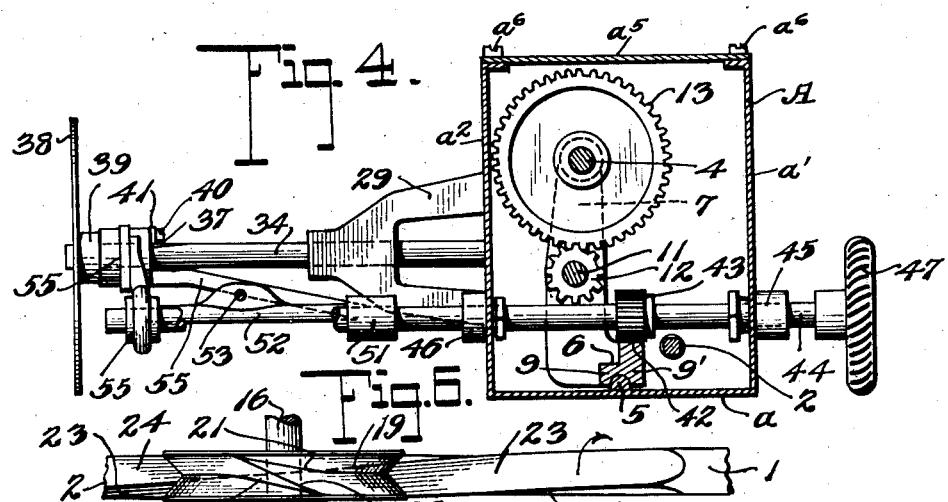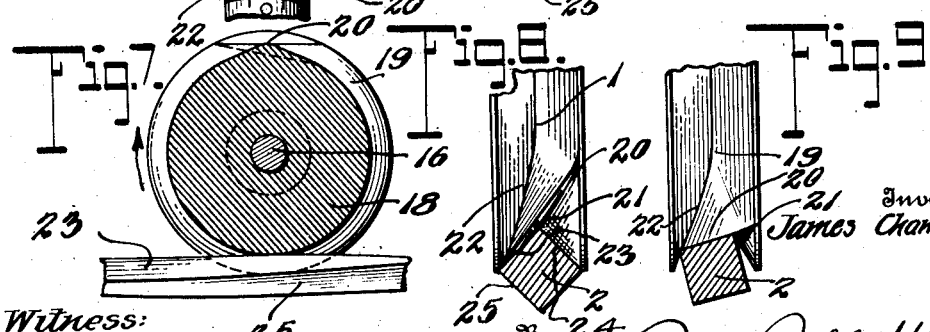

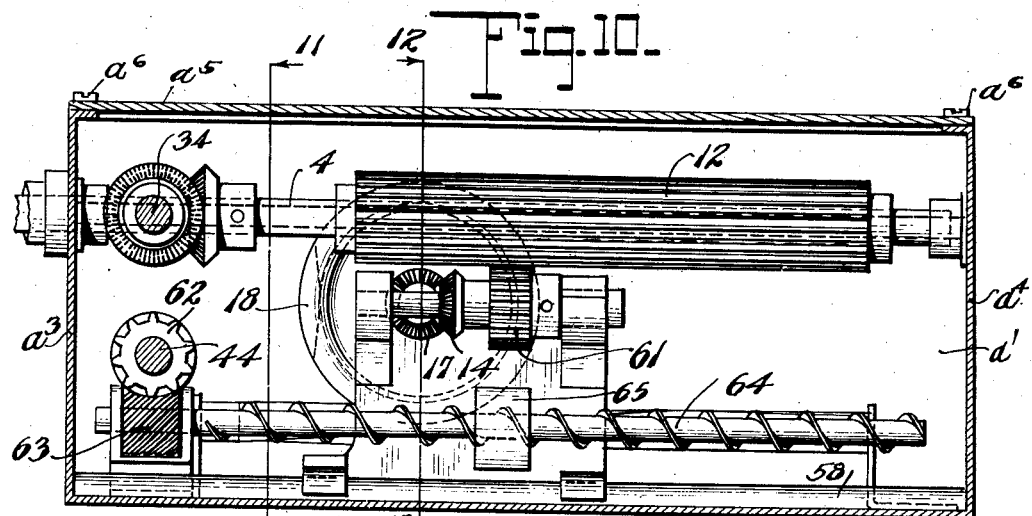

1,428,531

UNITED STATES PATENT OFFICE.

JAMES CHAMBLESS, OF JASPER, ALABAMA, ASSIGNOR OF ONE-HALF TO H. W. CRANFORD, OF JASPER, ALABAMA.

MOTION-PICTURE APPARATUS.

Application filed June 16, 1921. Serial No. 478,081.

*To all whom it may concern:*

Be it known that I, JAMES CHAMBLESS, a citizen of the United States, residing at Jasper, in the county of Walker and State of Alabama, have invented certain new and useful Improvements in Motion-Picture Apparatus, of which the following is a specification.

My invention relates to motion picture apparatus and has for one of its objects to provide improved means for producing an intermittent feeding of the film over the light aperture or window of the apparatus and for adjusting the film to frame the pictures thereon without interruption of the intermittent film movement.

Another object of the invention is to provide improved means for adjusting the film to frame the photographs thereon and for simultaneously adjusting the shutter in the degree of film adjustment to maintain the proper timed relation between the intermittent movement of the film and the shutter movement and without interruption of the intermittent film movement.

These and such other objects as may hereinafter appear are attained by the novel construction, combination and arrangement of parts to be hereinafter specifically described and claimed.

Reference will now be had to the accompanying drawings forming a part of this specification, wherein:

Figure 1 is a plan view of one form of apparatus embodying my invention, the casing being shown in section to expose the mechanism on the interior thereof.

Figure 2 is a vertical sectional view taken on the line 2—2 of Figure 1 looking in the direction of the arrows.

Figure 3 is an end view of the apparatus.

Figures 4 and 5 are vertical sectional views taken on the lines 4—4 and 5—5, respectively, of Figure 1, looking in the direction of the arrows.

Figures 6, 7, 8 and 9 are detail views of the rotary cam and its cooperating shaft for producing the intermittent motion of the film.

Figure 10 is a longitudinal vertical sectional view illustrating a slight modification of the apparatus shown in the preceding figures.

Figures 11 and 12 are vertical sectional views taken on the lines 11—11 and 12—12, respectively, of Figure 10.

Throughout the following detailed description and on the several figures of the drawing, similar parts are referred to by like reference characters.

Referring to the drawings, the mechanism illustrated therein is for use in moving picture machines of known construction to provide for the intermittent feeding of the film, the accurate framing of the pictures thereon, and the operation and adjustment of the shutter.

The major portion of the mechanism in both forms of the apparatus shown is mounted in an oil-tight casing A consisting of the base $a$, sides $a'$ and $a^2$, ends $a^3$ and $a^4$, and top $a^5$, the latter secured in place by screws $a^6$ or other suitable means. Projecting from the end wall $a^3$ of the casing and at right angles thereto is a plate $b$ having secured thereto by screws $b'$ a plate $b^2$ provided with a light aperture or window B.

Referring to Figures 1 to 9, inclusive, extending longitudinally of the casing near the bottom thereof and journaled in its end walls is a shaft 1 having a portion 2 square in cross-section. The faces of the square portion 2 extend spirally with respect to the longitudinal axis of the shaft as if this portion of the shaft had been twisted through an angle of approximately 90°. The shaft 1 extends beyond the end wall $a^3$ and carries on its projecting end a sprocket 3 adapted to intermittently move the film strip to bring the pictures thereon successively into operative relation to the window B.

Journaled in the end walls $a^3$ and $a^4$ above and to one side of the shaft 1 and parallel thereto is a drive shaft 4 and beneath the same and fixed in the end walls a rod 5. Slidably mounted upon the shaft 4 and rod 5 is a U-shaped carriage 6 having end members 7 and 8 and a base member 9, the latter having a groove 9' in its under side to receive the rod 5 and the end members 7 and 8 being provided at their upper ends with yoke members 10 to slidably engage the shaft 4. A shaft 11 parallel to the shafts 1 and 4 has its ends journaled in the end members 7 and 8 of the carriage 6 and fixed upon this shaft is an elongated pinion 12 with which meshes a gear 13 fixed upon the shaft 4. A bevel gear 14 is fixed upon the shaft 11 at one end of the pinion 12 and adjacent the end member 8 of the carriage. Integral with the end member 8 of the carriage and extending transversely of the casing A is an inverted U-shaped bracket 15 in which is rotatably mounted a short shaft 16 at right angles to the shafts 1, 4 and 11. One end of the shaft 16 projects beyond the bracket 15 and carries a bevel gear 17 in mesh with the bevel gear 14.

Fixed to the shaft 16 between the sides of the U-shaped bracket 15 is a cam wheel 18 formed with a peripheral channel or groove 19. At one point in the circumference of the cam wheel the groove is interrupted by a diagonally extending ridge 20 and the groove 19 merges into two oppositely extending diagonal end grooves 21 and 22 which extend to the side faces of the cam wheel and are separated by the ridge 20. The cam wheel is arranged to overlie in all positions of its adjustment, to be hereinafter described, the faceted or square portion 2 of the shaft 1 and the faces of the portion 2 cooperate with the groove 19, end grooves 21 and 22 and ridge 20 to hold the shaft 1 against rotary movement during the major portion of each revolution of the cam wheel but to give the shaft one quarter revolution for each complete revolution of the cam wheel.

The manner in which the cam wheel cooperates with the square portion 2 of the shaft 1 is shown in Figures 6, 7, 8 and 9. Referring to these figures and assuming that the cam wheel rotates in the direction of the arrow shown in Figure 7, it will be seen that during the major portion of each revolution of the cam wheel a pair of adjacent faces 23 and 24 of the portion 2 will be in close sliding contact with the walls of the V-shaped channel in the periphery of the cam wheel and that the shaft 1 will be held against rotation by reason of such contact. When, however, the cam wheel has revolved to a position to bring the ridge 20 into cooperation with the square portion 2, further rotation of the cam wheel will cause the ridge 20 to have a camming action on the face 23 causing the shaft 1 to rotate one quarter revolution in the direction of the arrow shown in Figure 6 and thereby bringing faces 23 and 25 into cooperation with the V-shaped groove 19, the end grooves 21 and 22 permitting such rotation of the shaft 1. One revolution, therefore, of the cam wheel, causes one-fourth of one revolution of the shaft 1.

The end wall $a^4$ of the casing is provided with an inwardly projecting bearing 26 in which the end of the shaft 4 is journaled. A collar 26' is fixed on the shaft 4 inside the casing adjacent the end wall $a^3$ to prevent longitudinal movement of the shaft with respect to the casing. The shaft 4 projects beyond the end wall $a^3$ and has fixed to its projecting end an operating handle 27. This shaft may be connected by suitable gearing to operate other parts of the motion picture apparatus, such as the upper and lower sprockets. The end wall $a^3$ is provided with an elongated bearing 28 outside the casing through which the shaft passes.

A bracket 29 is fixed on the bearing portion 28 by means of a clamp portion 30 and clamping screw 31. A lug 32 projects from the end wall $a^3$ beneath the bearing portion 28 and is provided with a screw-threaded aperture in its end. A screw 33 passes through an elongated slot in the bracket 29 and engages the screw-threaded aperture in the lug 32. By loosening the clamping screw 31 and the screw 33 the bracket may be rotatively adjusted on the shaft 4 to raise or lower the shutter, to be hereinafter described, with respect to the aperture B and the screws then tightened to hold the bracket in adjusted position.

Journaled in the bracket 29 is a shutter-operating shaft 34 having fixed thereto a worm pinion 35 with which meshes a worm gear 36 fixed on the projecting end of the shaft 4. The outer end portion of the shaft 34 is provided with a spiral groove 37. A shutter 38 has a hub portion 39 mounted on the grooved end portion of the shaft 34. Fixed to one end of the hub 39 by means of a screw 40 is a small plate 41 having an edge to contact with the groove 37. The screw 40 passes through an opening in the plate 41 which is slightly larger than the shank of the screw to permit the plate to be adjusted from time to time to compensate for wear. The plate 41 and spiral groove 37 permit the hub 39 to slide longitudinally of the shaft and compel it and the shutter to rotate therewith. Obviously the hub could be provided with other means such as a set screw to cooperate with the spiral groove 37.

The shutter is provided with the usual blades which cooperate with the aperture B in timed relation with the intermittent movement of the film to exclude the light during such intermittent movement.

The base member 9 of the U-shaped carriage 6 is provided with a rack 42 with which cooperates a pinion 43 fixed to a shaft 44 extending transversely of the casing A and journaled in the side walls $a'$ and $a^2$ thereof, collars 45 and 46 being fixed on the shaft and cooperating with the side walls $a'$ and $a^2$ to prevent longitudinal motion of the shaft. The shaft 44 is arranged parallel to the shutter shaft 34 and has fixed to one end thereof an operating wheel 47. Fixed on the opposite end portion of the shaft 44 by means of a set-screw is an elongated sleeve 48 provided in its periphery with a spiral groove 49.

A bracket 50 is slidably mounted on the shaft 44 by means of the bearing portions 51 at one end of the bracket, the sleeve 48 being located between the bearing portions 51 but of less length than the distance therebetween. The bracket 50 is provided with a cross-member 52 carrying a screw 53 having its end engaged in the spiral groove 49. Obviously rotation of the shaft 44 will cause the bracket 50 to move longitudinally with respect to the shaft 44.

The hub 39 of the shutter 38 is provided with an annular groove 54 engaged by a bifurcated member 55 secured to the other end of the bracket 50 whereby when the bracket is shifted longitudinally of the shaft 44 the hub 39 will be shifted longitudinally of the shaft 34 and the shutter will be given a rotary movement with respect thereto due to the engagement of the plate 41 with the spiral groove 37.

In the operation of the apparatus the operator will turn the drive shaft 4 by means of the handle 27 with his right hand. The rotation of the shaft 4 will cause the cam wheel 18 to turn through the gear connection between the drive shaft and the cam wheel and will also cause rotation of the shutter shaft 34 through the gear connection between the shafts 4 and 34. For each complete revolution of the cam wheel 18 the shaft 1 will be given one-quarter revolution as previously explained to intermittently rotate the sprocket 3 to advance the film over the light aperture B. If the pictures on the film are not accurately framed, that is to say, if the line of division between two of them is visible on the screen, the operator will manipulate the hand wheel 47 with his left hand while turning the drive shaft 4 with his right hand to turn the shaft 44 in a direction to move the U-shaped member 6 toward one end or the other of the casing through the pinion 43 and rack 42. This movement of the U-shaped member 6 will cause the cam wheel 18 to move longitudinally of the shaft 1 and cooperate with the square portion 2 thereof to cause a rotative adjustment of the shaft 1 which is quite independent of the intermittent rotation of the shaft 1 caused by the rotation of the cam wheel 18 with respect to the square portion 2. It is to be noted that during rotation of the cam wheel 18, assuming that no adjustment of the cam wheel longitudinally of the shaft 1 is taking place, the V-shaped groove in the cam wheel cooperates with the square portion of the shaft during the greater portion of the revolution of the cam wheel to prevent rotation of the shaft 1, and that during adjustment of the cam wheel 18 longitudinally of the shaft 1, assuming that no rotation of the cam wheel is taking place, the V-shaped groove in the cam wheel cooperates with the spiral faces of the square portion 2 to cause rotation of the shaft 1. The gear connection including the elongated pinion 12 between the drive shaft 4 and the rotary cam wheel 18 permits adjustment of the latter longitudinally of the shaft 1 while preventing free rotation of the cam wheel so that the walls of the V-shaped groove 19 have a camming action on the spiral faces of the square portion 2. It will be obvious that if the sliding carriage 6 is adjusted by means of the shaft 44 to move the cam wheel longitudinally of the shaft 1 while the shaft 4 is not rotating the cam wheel will merely slide in contact with the square portion 2 without rotating at all. If the cam wheel were not held against free rotation by the gear connection between the cam wheel and drive shaft 4 during adjustment of the cam wheel longitudinally of the shaft 1 the cam wheel would simply roll over the square portion 2 without causing rotation of the shaft 1. As a matter of fact, in the ordinary operation of the apparatus, the longitudinal adjustment of the cam wheel with respect to the shaft will take place simultaneously with the rotation of the cam wheel and the effect of the rotary movement of the cam wheel on the shaft 1 is not modified by its longitudinal adjustment with respect thereto and vice versa. An extreme movement of the cam wheel 18 from one end to the other of the square portion 2 is sufficient to turn the shaft 1 one quarter turn in one direction or the other and this movement of the shaft 1 will advance or retard the film a distance equal to the length of one picture. It will thus be seen that the carriage 6 has a range of adjustment sufficient to cause the accurate framing of a picture no matter how badly it may be out of register with the aperture B.

In order to maintain the proper timed relation between the intermittent movement of the film and the movement of the shutter it is necessary to rotatively adjust the latter on its shaft 34 simultaneously with the adjustment of the shaft 1 to frame the pictures, and this adjustment of the shutter should be in the degree of film adjustment. In turning the shaft 44 by means of the hand wheel 47 to shift the cam 18 along the square portion 2 of the shaft 1 the sleeve 48 is rotated and its spiral groove 49 in cooperation with the screw 53 causes the bracket 50 to be shifted in one direction or the other along the shaft 44 and this movement of the bracket causes a corresponding movement of the shutter along its shaft 34 and due to the cooperation between the plate 41 and spiral groove 37 the shutter will be rotated with respect to its shaft. The spiral grooves 37 and 49 can obviously be given such a form that the resultant adjustment of the shutter will correspond exactly to the adjustment of the film to frame the pictures thereon so as to maintain the timed relation between the intermittent movement of the film and the movement of the shutter.

In the form of the apparatus illustrated in Figures 10, 11 and 12, I am enabled to use a shorter sliding carriage for the cam wheel 18, and hence to shorten the casing A.

In this form of the apparatus the elongated pinion 12 is mounted on the drive shaft 4. The carriage for the cam wheel 18 is indicated by the reference numeral 56. Extending longitudinally of the casing A adjacent the bottom thereof are parallel spaced rods or bars 57 and 58 and another rod 59 extends longitudinally of the casing near the top thereof and the carriage 56 has grooved portions to slidably engage these rods. The cam wheel 18 is mounted on a rotary shaft 16 in the carriage 56 which is provided at its end with a bevel gear 17 in mesh with a bevel gear 14 on the end of a short rotary shaft 60 parallel to the driving shaft 4. The shaft 60 carries a pinion 61 in mesh with the elongated pinion 12.

The shaft 44 for adjusting the shutter and moving the cam wheel 18 longitudinally of the shaft 1 to frame the pictures is mounted in the casing near one end thereof and has fixed thereto a worm pinion 62 in mesh with a worm pinion 63 on the end of a feed screw 64 mounted in the casing parallel to the drive shaft 4. The feed screw extends through a lug 65 integral with or secured to the carriage 56 and having a threaded bore for cooperation with the feed screw. Obviously rotation of the shaft 44 will cause the feed screw to rotate and move the carriage 56 longitudinally of the casing.

The shutter shaft 34 in Figures 10, 11 and 12 extends through the side wall $a^2$ of the casing and has a bevel gear 66 on its end in mesh with a bevel gear 67 on the drive shaft 4. The shutter shaft is operatively connected with the shaft 44 by the same means as illustrated in Fig. 1.

It will be seen that the apparatus illustrated in the Figures 10, 11 and 12 operates in substantially the same manner as that illustrated in Figures 1 to 9, inclusive, the only advantage of the structure illustrated in Figures 10, 11 and 12 over that illustrated in Figures 1 to 9, inclusive, residing in the more compact arrangement of the mechanism.

Having thus described my invention, what I claim as new and desire to secure by Letters Patent is:

1. In motion picture apparatus of the character described, the combination with a film moving shaft having a spirally extending cam portion, a rotary member having an elongated cam portion engaging and cooperating with the spiral cam of the shaft for intermittently rotating the latter, and means for sliding the elements relative to each other to frame the picture without interruption of the intermittent film movement.

2. In motion picture apparatus having a light aperture therein, means for intermittently moving a strip of film over said aperture comprising a rotary member having an elongated cam portion and a member rotatable with respect to said cam portion for causing intermittent rotary movement of said rotary member, said rotatable member being also slidable with respect to said cam portion for adjusting said rotary member to frame the pictures on said film, and means for sliding said rotatable member with respect to said cam portion without interruption of the intermittent film movement.

3. In motion picture apparatus having a light aperture therein, means for intermittently moving a strip of film over said aperture comprising a rotary shaft having an elongated cam portion polygonal in cross-section, the faces of said cam portion extending spirally with respect to the longitudinal axis of said shaft, and a member rotatable with respect to said cam portion for causing intermittent rotary movement of said rotary member, said rotatable member being also slidable with respect to said cam portion for adjusting said rotary member to frame the pictures on said film, and means for sliding said rotatable member with respect to said cam portion without interruption of the intermittent film movement.

4. In motion picture apparatus, a casing, a member having a light aperture therein, means for intermittently moving a strip of film over said aperture comprising a rotary shaft mounted in said casing and having an elongated cam portion, a member rotatable with respect to said cam portion for causing intermittent rotary movement of said rotary shaft, a drive shaft mounted in said casing, a train of gears between said rotatable member and said drive shaft and means for operating said drive shaft, said rotatable member being also slidable with respect to said cam portion without disconnecting the gear connection between said rotatable member and drive shaft for adjusting said rotary shaft to frame the pictures on said film, and means for sliding said rotatable member with respect to said cam portion.

5. In motion picture apparatus, a casing, a member having a light aperture therein, means for intermittently moving a strip of film over said aperture comprising a rotary shaft mounted in said casing and having an elongated cam portion, a drive shaft mounted in said casing parallel to said rotary shaft and having a gear fixed thereto, a member slidably mounted in said casing for movement parallel to the axes of said shafts, a shaft rotatably mounted in said slidable member parallel to said drive and rotary shafts and having fixed thereto an elongated pinion in mesh with the gear on said drive shaft and also having fixed thereto a bevel gear, a shaft rotatably mounted in said slidable member at right angles to said drive and rotary shafts and having fixed thereto a bevel gear in mesh with said first-mentioned bevel gear and also having fixed thereto a cam wheel for cooperation with the cam portion of said rotary shaft and means for operating said drive shaft, rotation of said cam wheel through said gear connection with said drive shaft causing intermittent rotary movement of said rotary shaft and movement of said cam wheel longitudinally of said cam portion through sliding movement of said slidable member causing adjustment of said rotary shaft to frame the pictures on said film without interruption of the intermittent film movement, and means for moving said slidable member.

6. In motion picture apparatus of the character described, the combination with a film moving shaft having a spirally extending cam portion, of a rotary member formed with an elongated cam portion engaging the spiral cam of the shaft to intermittently rotate the latter, a shutter, means for producing relatively sliding movement of the shaft and rotary member to frame the picture, and means for simultaneously adjusting the shutter to maintain proper synchronism between the action of the shutter and the movements of the film.

7. In motion picture apparatus having a light aperture therein, a shutter movable with relation to said aperture to exclude the light, means for operating said shutter, means for intermittently moving a strip of film over said aperture comprising a rotary member having an elongated cam portion, and a cam member rotatable with respect to said cam portion for causing intermittent rotary movement of said rotary member, said cam member being slidable with respect to said cam portion for adjusting said rotary member to frame the pictures on said film, and means for sliding said cam member with respect to said cam portion and for simultaneously adjusting said shutter in the degree of film adjustment.

8. In motion picture apparatus of the character described, the combination with a film moving shaft, a rotary member engaging the shaft and cooperating therewith to intermittently rotate the shaft, means for sliding the rotary member upon the shaft, and means whereby this sliding movement of the rotary member enables the picture to be framed without interruption of the intermittent film movement.

9. In motion picture apparatus of the character described, the combination with a film moving shaft, a rotary member engaging the shaft and cooperating therewith to intermittently rotate the shaft, a shutter, an adjusting member, means actuated by the adjusting member for moving the rotary member longitudinally of the shaft, means whereby the said longitudinal movement of the rotary member enables the picture to be framed without interruption of the film movement, and means simultaneously actuated by the adjusting member to maintain proper synchronism between the action of the shutter and the movements of the film.

10. In motion picture apparatus having a light aperture therein, means for intermittently moving a strip of film over said aperture, a shaft, means for rotating said shaft, a shutter having a hub mounted on said shaft, said shaft having a cam portion spirally arranged with respect to the longitudinal axis thereof, means carried by said hub for engagement with said cam portion to compel said shutter to rotate with said shaft while permitting it to be shifted longitudinally thereof to cause a rotary adjustment of the shutter with respect to its shaft, and means for adjusting said film to frame the pictures thereon and for simultaneously adjusting said shutter in the degree of film adjustment without interruption of the intermittent film movement and the shutter movement, comprising a rotary shaft parallel to said shutter shaft and having a sleeve fixed thereto, said sleeve having a spiral groove in its periphery, and a bracket slidably mounted at one end upon said shaft and having a pin in engagement with said spiral groove and engaging said hub with its other end.

11. Mechanism comprising a driven rotary member having an elongated cam portion, a driving member rotatable with respect to said cam portion for converting continuous rotary motion of said driving member into intermittent rotary motion of said driven member and slidable longitudinally of said cam portion to produce rotary motion of said driven member without rotation of said driving member, means for continuously rotating said driving member while permitting sliding movement thereof longitudinally of said cam portion, and means for moving said driving member longitudinally of said cam portion.

12. Mechanism comprising a rotary driven member having an elongated faceted portion, the faces of said faceted portion extending spirally with respect to the longitudinal axis of said driven member, a rotary cam wheel having a peripheral groove for cooperation with said faceted portion to prevent rotation of said driven member during the major portion of a revolution of said cam wheel, said cam wheel having a cam portion in its periphery for cooperation with said faceted portion to cause intermittent rotation of said driven member during continuous rotation of said cam wheel, a sliding carriage for said cam wheel, a train of gears for continuously rotating said cam wheel while permitting sliding movement of said carriage, and means for sliding said carriage, said groove in said cam wheel cooperating with said faceted portion during sliding movement of said carriage to rotate said driven member independently of the intermittent rotation thereof caused by the continuous rotation of said cam wheel.

13. In motion picture apparatus, a casing, a member having a light aperture therein, and means for intermittently moving a strip of film over said aperture comprising a driven rotary member mounted in said casing and having an elongated cam portion, a cam wheel rotatable with respect to said cam portion for converting continuous rotary motion of said cam wheel into intermittent rotary motion of said driven member and slidable with respect to said cam portion to cause rotation of said driven member without rotation of said cam wheel, a sliding carriage for said cam wheel, a train of gears comprising an elongated pinion for continuously rotating said cam wheel while permitting sliding movement of said carriage, and means for sliding said carriage comprising a feed screw mounted in said casing.

14. In motion picture apparatus, the combination with a film moving shaft provided with a spirally disposed cam, a cam wheel engaging the spiral cam of the shaft and cooperating therewith to produce an intermittent rotation of the shaft, a sliding carriage for said cam wheel, means for continuously driving the cam wheel during the operation of the apparatus, and means for sliding the carriage while the cam wheel is being driven to frame the picture without interruption of the intermittent film movement.

In testimony whereof I affix my signature.

JAMES CHAMBLESS.